(12) United States Patent
Asakura et al.

(10) Patent No.: US 8,230,963 B2
(45) Date of Patent: Jul. 31, 2012

(54) ELECTRIC POWER STEERING SYSTEM

(75) Inventors: Toshihiro Asakura, Chiryu (JP); Takashi Hara, Toyokawa (JP)

(73) Assignee: JTEKT Corporation, Osaka-Shi (JP)

( * ) Notice: Subject to any disclaimer, the term of this patent is extended or adjusted under 35 U.S.C. 154(b) by 213 days.

(21) Appl. No.: 12/861,446

(22) Filed: Aug. 23, 2010

(65) Prior Publication Data

US 2011/0048839 A1    Mar. 3, 2011

(30) Foreign Application Priority Data

Aug. 31, 2009 (JP) ................. 2009-199786
Aug. 31, 2009 (JP) ................. 2009-199787

(51) Int. Cl.
*B62D 5/04* (2006.01)
(52) U.S. Cl. ........................................ 180/444
(58) Field of Classification Search ............ 180/444
See application file for complete search history.

(56) References Cited

U.S. PATENT DOCUMENTS

| 5,988,311 | A | 11/1999 | Kuribayashi et al. | |
| 6,439,339 | B1 | 8/2002 | Namgung | |
| 6,848,534 | B2* | 2/2005 | Toyofuku et al. | 180/444 |
| 2002/0063014 | A1 | 5/2002 | Yoshida et al. | |
| 2004/0154857 | A1* | 8/2004 | Fukuda et al. | 180/444 |
| 2009/0255752 | A1 | 10/2009 | Asakura et al. | |
| 2010/0200326 | A1 | 8/2010 | Asakura et al. | |
| 2010/0206656 | A1 | 8/2010 | Asakura et al. | |

FOREIGN PATENT DOCUMENTS

| DE | 10 2007 024 328 A1 | 11/2008 |
| EP | 0 882 637 A1 | 12/1998 |
| JP | A-6-255501 | 9/1994 |
| JP | A-2006-224938 | 8/2006 |
| JP | A-2006-256414 | 9/2006 |
| JP | A-2007-239782 | 9/2007 |

OTHER PUBLICATIONS

European Search Report for corresponding European Patent Application No. 10174450.6, mailed on Nov. 25, 2010.
European Search Report for corresponding European Patent Application No. 10174451.4, mailed on Nov. 25, 2010.
New U.S. Patent Application filed Aug. 23, 2010 for Toshihiro Asakura et al., entitled "Electric Power Steering System,", U.S. Appl. No. 12/861,164.

* cited by examiner

*Primary Examiner* — Tony Winner
(74) *Attorney, Agent, or Firm* — Oliff & Berridge, PLC (57) ABSTRACT

In an electric power steering system, a ball screw nut (23) of a ball screw device that drives a rack shaft is screwed to an axial end portion (6a) of a motor shaft (6) when a threaded portion (31) of a hollow threaded shaft (30) formed at an axial end portion (23a) of the ball screw nut (23) is screwed to a threaded portion (32) formed in the inner periphery of a motor shaft (6). A flange member (33) that is larger in diameter than the ball screw nut (23) is fitted to the outer periphery of the axial end portion (6a) of the motor shaft (6). The flange member (33) is formed in such a manner that when the rotation of the flange member (33) is restricted, the rotation of the ball screw nut (23) and the motor shaft (6) in the same direction is restricted when the ball screw nut (23) is screwed to the motor shaft (6).

6 Claims, 12 Drawing Sheets

ELECTRIC POWER STEERING SYSTEM

INCORPORATION BY REFERENCE

The disclosure of Japanese Patent Application No. 2009-199787 filed on Aug. 31, 2009 including the specification, drawings and abstract is incorporated herein by reference in its entirety.

BACKGROUND OF THE INVENTION

1. Field of the Invention

The invention relates to an electric power steering system that includes a ball screw device.

2. Description of the Related Art

There is an existing rack-assist-type electric power steering system (EPS) that includes a hollow shaft, through which a rack shaft passes, and that converts the rotation of the hollow shaft rotated by a motor into axial movement of the rack shaft using a ball screw device to supply assist force to a steering system.

In the EPS described above, the ball screw device is formed by arranging a plurality of balls between a ball screw nut secured to the hollow shaft and a threaded portion formed in the rack shaft. When a threaded portion formed in the inner periphery of the ball screw nut and the threaded portion formed in the outer periphery of the rack shaft face each other, a helical ball-rolling path is formed. Each ball arranged in the ball-rolling path rolls under load. Thus, the rotation of the ball screw nut is converted into axial movement of the rack shaft.

For example, Japanese Patent Application Publication No. 2006-256414 (JP-A-2006-256414) describes a structure for securing a ball screw nut to a hollow shaft. According to JP-A-2006-256414, the ball screw nut is fitted into a housing recess, formed in the inner periphery of the hollow shaft, in the axial direction, and the axial position of the ball screw nut is determined by a locknut. Employment of this structure makes it possible to reduce the axial length.

However, employment of the above-described structure causes an increase in the diameter of a portion of the hollow shaft, at which the ball screw nut and the hollow shaft overlap each other. Further, clamping the ball screw nut using the locknut may cause deformation of the ball screw nut, resulting in distortion of a thread groove that forms a ball-rolling path. The distortion hinders smooth rolling of each ball in the ball-rolling path, which may cause abnormal sound, vibration, and deterioration of steering feel.

Therefore, for example, Japanese Patent Application Publication No. 6-255501 (JP-A-6-255501) describes a structure in which flanges that extend radially outward are formed at axial ends of a ball screw nut and a hollow shaft, and the flanges are fastened to each other to connect the ball screw nut and the hollow shaft to each other. This structure makes it possible to secure the ball screw nut and the hollow shaft to each other in such a manner that the ball screw nut and the hollow shaft are not allowed to rotate relative to each other, without causing deformation of the ball screw nut.

However, in the above-described structure, the flanges need to be fastened to each other with a plurality of bolts. Fastening the flanges to each other with a plurality of bolts is cumbersome. Therefore, it is difficult to increase the productivity.

Japanese Patent Application Publication No. 2007-239782 (JP-A-2007-239782) describes a structure in which a threaded portion is formed in the outer periphery of a ball screw nut and the ball screw nut is screwed to the inner periphery of a hollow shaft. Employment of this structure makes it possible to disperse stress applied to the ball screw nut to the entirety of the outer periphery of the ball screw nut. Thus, it is possible to restrict deformation of the ball screw nut and distortion of a ball-rolling path due to the deformation. In addition, it is possible to improve the work efficiency during production.

However, it is difficult to form a threaded portion in the entirety of the outer periphery of a ball screw nut that has high strength and rigidity. In addition, providing the ball screw nut in a hollow shaft causes upsizing of a portion of the hollow shaft at which the ball screw nut is located. Therefore, a ball screw nut may be screwed (connected) to an axial end portion of a hollow shaft. Thus, it is possible to easily form a threaded portion in the ball screw nut without upsizing of a portion of the hollow shaft, to which the ball screw nut is connected.

However, even if the structure in which the ball screw nut is screwed to the axial end portion of the hollow shaft is employed, there is still a problem that should be solved.

In many coaxial-motor-type electric power steering systems such as an EPS described in Japanese Patent Application Publication No. 2007-239782 (JP-A-2007-239782) in which a hollow shaft serves also as a motor shaft and therefore a rack shaft and a motor are arranged coaxially with each other, openings formed at respective axial ends of a motor housing are blocked by side housings that are fitted to the respective axial ends. Because the motor shaft is rotatably supported in a motor stator formed on the inner periphery of the motor housing, the motor shaft is arranged coaxially with the rack shaft that passes through the housings in the axial direction.

In one of the two side housings, usually, a rack guide that constitutes a rack-and-pinion mechanism is formed. In the EPS described in JP-A-2007-239782, a ball bearing is provided in the side housing that blocks one of the openings and the motor shaft is supported by the ball bearing. Thus, the efficiency of assembly is improved, Therefore, one of the openings at the respective ends of the motor housing is blocked by the side housing in which the rack guide is formed, before the rack shaft is passed through the housing.

That is, the ball screw nut is screwed to the rack shaft to form a ball screw device, and then inserted in the motor housing through the remaining opening. Then, the ball screw nut is connected to the motor shaft in the axial direction. This structure makes it difficult to screw the ball screw nut to the motor shaft when the ball screw nut is screwed to the axial end portion of the motor shaft as described above.

In the electric power steering systems as those described in JP-A-2006-256414 and JP-A-2007-239782, a locknut and a ball screw nut are screwed to the inner periphery of a motor shaft. In the structure described in these documents, if an engaged portion is formed in the axial end face of the motor shaft, it is possible to perform the work for screwing the locknut and the ball screw nut to the inner periphery of the motor shaft with the rotation of the motor shaft restricted by a jig.

However, in the structure in which the ball screw nut is screwed to the axial end portion of the motor shaft, it is not possible to form the above-described engaged portion in the axial end face to which the ball screw nut is screwed. Therefore, it is difficult of restrict the free rotation of the motor shaft. Accordingly, it is difficult to prevent the simultaneous rotation of the motor shaft and the ball screw nut in the same direction that is caused when the ball screw nut is screwed to the motor shaft, that is, it is difficult to prevent the motor shaft from rotating together with the ball screw nut. On this point, there is still room for improvement.

SUMMARY OF THE INVENTION

It is an object of the invention to provide an electric power steering system that makes it possible to secure a ball screw nut to a motor shaft without causing deformation, thereby achieving high reliability, sufficient quietness and good steering feel, and improving the working efficiency during production.

An aspect of the invention relates to an electric power steering system that includes: a rack shaft that is able to reciprocate in an axial direction; a motor shaft through which the rack shaft passes; and a ball screw device that converts rotation of the motor shaft into axial movement of the rack shaft. The ball screw device is formed by arranging a plurality of balls within a helical ball-rolling path that is formed by aligning a thread groove formed in an inner periphery of a ball screw nut and a thread groove fanned in an outer periphery of the rack shaft with each other. The ball screw nut is inserted into a motor housing that has openings at respective axial ends, one of the openings being blocked by a side housing fitted to the motor housing, through the remaining opening that is not blocked. The ball screw nut is screwed to the motor shaft, which is rotatably supported in the motor housing, in the axial direction and secured to an axial end portion of the motor shaft. A hollow threaded shaft that is screwed to a threaded portion formed in the axial end portion of the motor shaft is formed in an axial end portion of the ball screw nut, and a flange member is fitted to the motor shaft. The flange member is larger in diameter than the ball screw nut, and has an engaged portion that restricts rotation of the flange member when being engaged with a restricting member. Simultaneous rotation between the motor shaft and the ball screw nut in the same direction that may occur when the ball screw nut is screwed to the motor shaft is restricted by restricting the rotation of the flange member.

The threaded shaft is formed in the axial end portion of the ball screw nut, and the threaded shaft is screwed to the axial end portion of the motor shaft. Thus, stress that is applied to a main portion in which a thread groove is formed is reduced, and the likelihood that the thread groove is deformed is drastically reduced. As a result, it is possible to achieve sufficient quietness and good steering feel.

If the above-described flange member is fitted to the motor shaft, even if the ball screw nut is screwed to the motor shaft through one of the openings formed at the respective axial end portions of the motor housing, it is possible to restrict the rotation of the motor shaft using a jig or a tool as the restricting member. As a result, even in the structure in which a force that rotates the motor shaft in the same direction as the ball screw nut, that is, a force that causes the motor shaft to rotate together with the ball screw nut is applied to the motor shaft when the ball screw nut is screwed to the motor shaft, it is possible to restrict the motor shaft from rotating together with the ball screw nut and to secure the ball screw nut to the motor shaft more easily and reliably. Thus, it is possible to improve the work efficiency and the reliability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
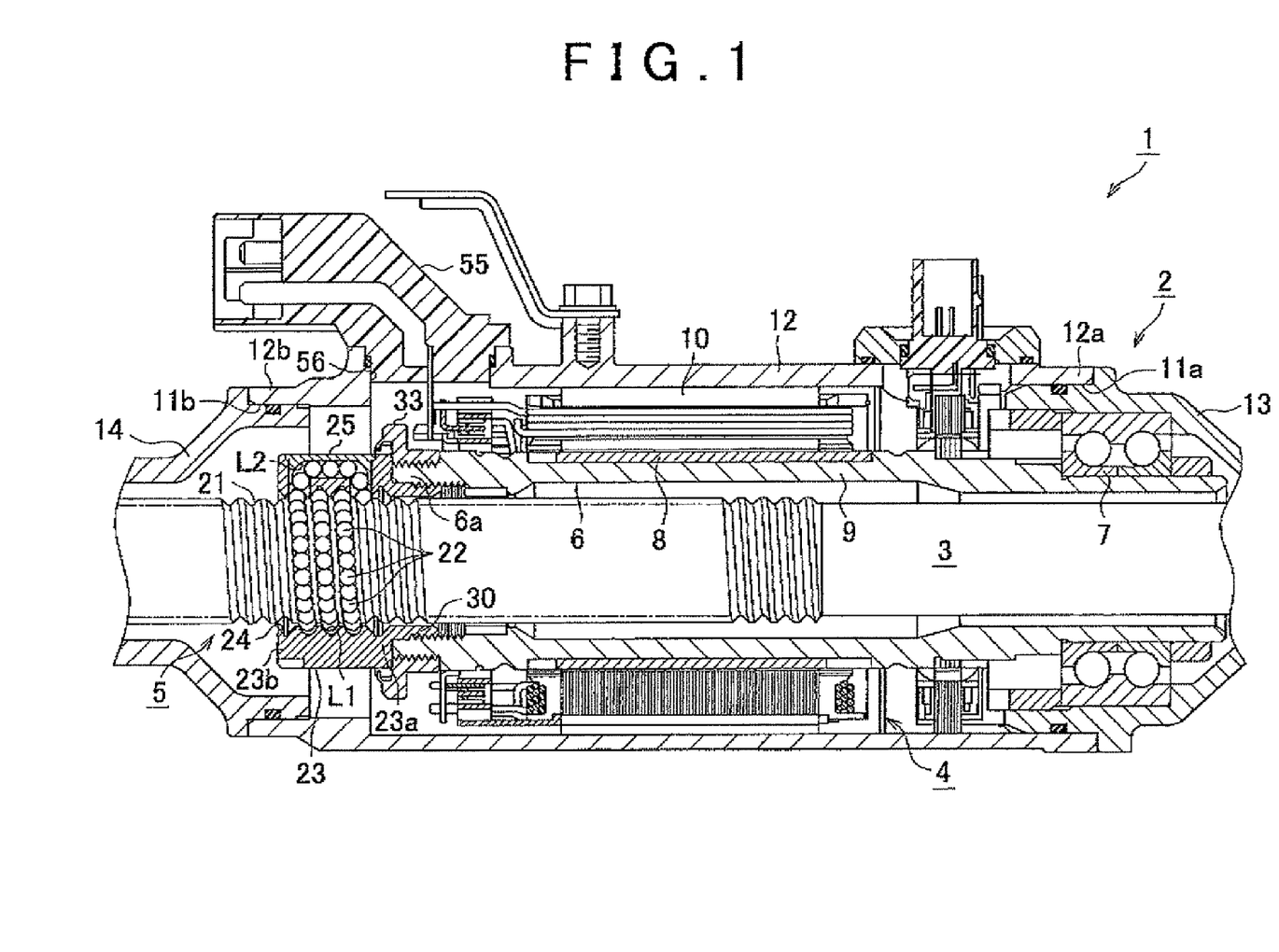
FIG. 1 is a cross-sectional view schematically showing the structure of an electric power steering system (EPS)

Hereafter, an embodiment of the invention will be described with reference to the accompanying drawings. As shown in FIG. 1, in an electric power steering system (EPS) 1 according to the embodiment, a rack shaft 3 that passes through a substantially cylindrical housing 2 is supported by a rack guide (not shown) and a plain bearing (not shown). Thus, the rack shaft 3 is supported and housed in the housing 2 so as to be movable along its axial direction. The rack shaft 3 is connected to a steering shaft via a known rack-and-pinion mechanism so that the rack shaft 3 reciprocates along the axial direction in response to a steering operation.

The EPS 1 includes a motor 4 that serves as a drive source, and a ball screw device 5 that converts the rotation of the motor 4 into axial movement of the rack shaft 3. The EPS 1 according to the embodiment is formed as a rack-assist-type EPS in which the rack shaft 3, the motor 4 and the ball screw device 5, which are fitted together, are housed in the housing 2.

More specifically, the motor 4 has a motor shaft 6 that is a hollow shaft. The motor shaft 6 is supported by a bearing 7 provided on the inner periphery of the housing 2 so that the motor shaft 6 extends along the axial direction of the housing 2. In the motor 4, a motor rotor 9 is formed by fixing a magnet 8 to a peripheral face of the motor shaft 6. A motor stator 10 that surrounds the outer periphery of the motor rotor 9 is secured to the inner periphery of the housing 2 and the rack shaft 3 is passed through the motor shaft 6. Thus, the motor 4 is arranged coaxially with the rack shaft 3 in the housing 2.

The housing 2 is formed by fitting a cylindrical motor housing 12 and side housings 13 and 14 together. The motor housing 12 has openings 11*a* and 11*b* at respective axial ends thereof. The side housings 13 and 14 are fitted to axial ends 12a and 12b of the motor housing 12 to block the openings 11a and 11b, respectively.

More specifically, a rack guide is formed in the side housing 13 that is fitted to the right axial end portion 12a of the motor housing 12 as shown in FIG. 1. The rack guide supports the rack shaft 3 and forms a rack-and-pinion mechanism by pushing the rack shaft 3 against a pinion shaft (not shown). The bearing 7 that supports the motor shaft 6 is arranged in the side housing 13. When the side housing 13 is fitted to the axial end portion 12a of the motor housing 12, the motor shaft 6 is arranged on the inner side of the motor stator 10 that is formed on the inner periphery of the motor housing 12. The rack shaft 3 and the ball screw device 5 are placed into the motor housing 12 through the remaining opening among the openings 11a and 11b formed at the respective axial ends of the motor housing 12, that is, the opening 11b formed at the left axial end portion 12b of the motor housing 12 in FIG. 1.

A thread groove 21 is formed in the outer periphery of the rack shaft 3, whereby the rack shaft 3 is formed as a threaded shaft. The ball screw device 5 is formed by screwing a ball screw nut 23 to the rack shaft 3 via a plurality of balls 22.

Figure 2:
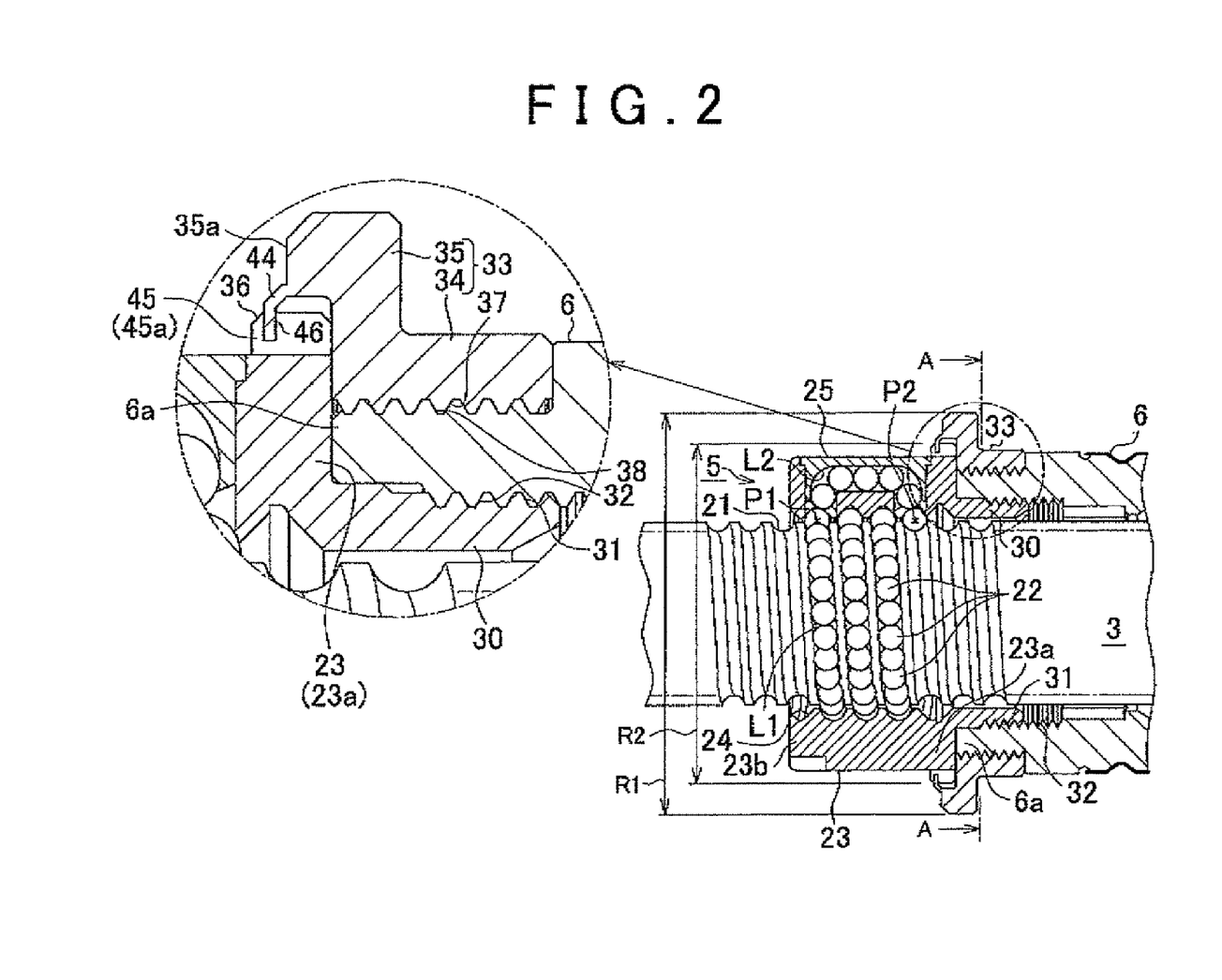
FIG. 2 is an enlarged cross-sectional view showing a ball screw device and portions near the ball screw device.

More specifically, as shown in FIG. 2, a thread groove 24 that corresponds to the thread groove 21 of the rack shaft 3 is formed in the inner periphery of the substantially cylindrical ball screw nut 23. The ball screw nut 23 is fitted to the outer periphery of the rack shaft 3 in such a manner that the thread groove 24 is aligned with the thread groove 21 of the rack shaft 3. The balls 22 are arranged in a helical ball-rolling path L1 that is formed by aligning two thread grooves 21 and 24 with each other.

A return path L2 that opens into the thread groove 24 at two positions (connection points P1 and P2) is formed in the ball screw nut 23. The return path L2 is formed by fitting a circulation member 25 to the ball screw nut 23. The circulation member 25 has a function of scooping the balls 22 up from the ball-rolling path L1 and a function of discharging the balls 22 into the ball-rolling path L1. The return path L2 serves as a short-cut between the two connection points P1 and P2 that are set in the ball-rolling path L1 and that correspond to the openings of the return path L2.

The balls 22 arranged in the ball-rolling path L1 formed between the rack shaft 3 and the ball screw nut 23 roll in the ball-rolling path L1 under load due to the rotation of the ball screw nut 23 relative to the rack shaft 3. The balls 22 that have passed through the ball-rolling path L1 pass through the return path L2 formed in the ball screw nut 23. In this way, the balls 22 move from the downstream side to the upstream side between the two connection points P1 and P2 that are set in the ball-rolling path L1. The balls 22 that roll in the ball-rolling path L1 are infinitely circulated through the return path L2, whereby the ball screw device 5 converts the rotation of the ball screw nut 23 into the axial movement of the rack shaft 3.

In the embodiment, the ball screw nut 23 is connected to an axial end portion 6a of the motor shaft 6, and the rotation of the motor 4 that is the drive source is input in the ball screw device 5 when the ball screw nut 23 rotates together with the motor shaft 6. Then, the EPS 1 converts the motor torque into a pushing force that is applied in the axial direction of the rack shaft 3, and applies the pushing force to a steering system as an assist force for assisting a steering operation.

Next, a structure for securing the ball screw nut in the EPS according to the embodiment will be described.

Figure 3:
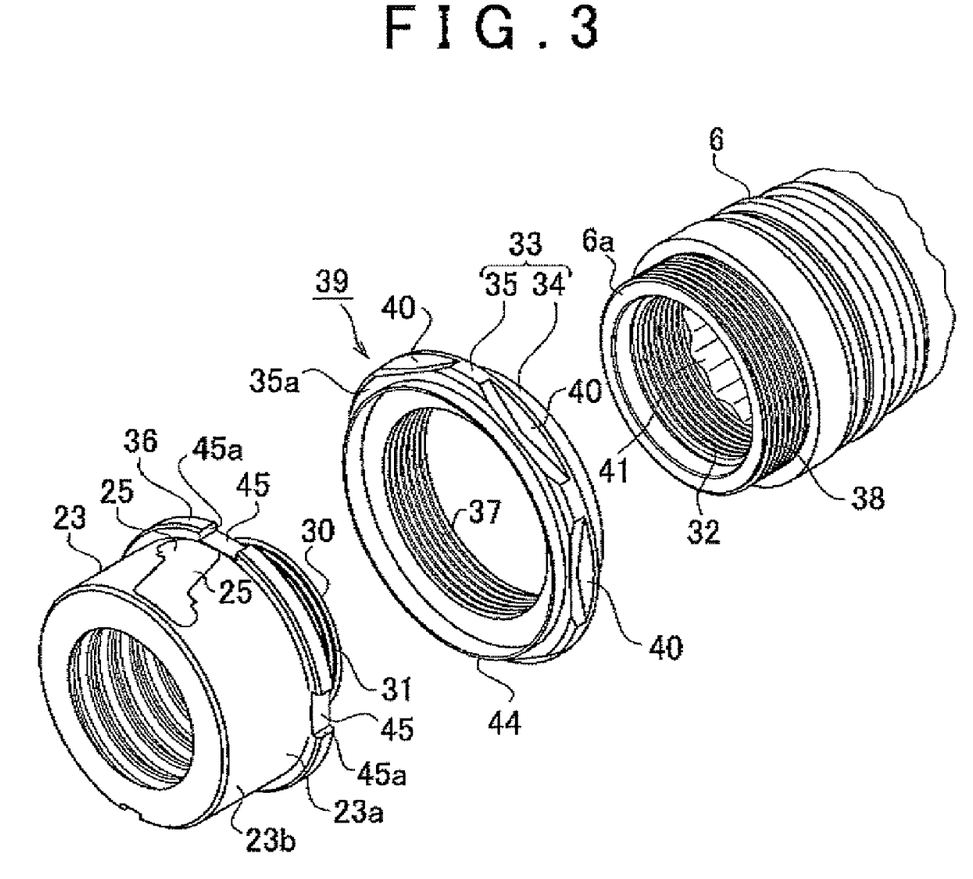
FIG. 3 is a perspective view showing a ball screw nut, a motor shaft, and a flange member.
Figure 4:
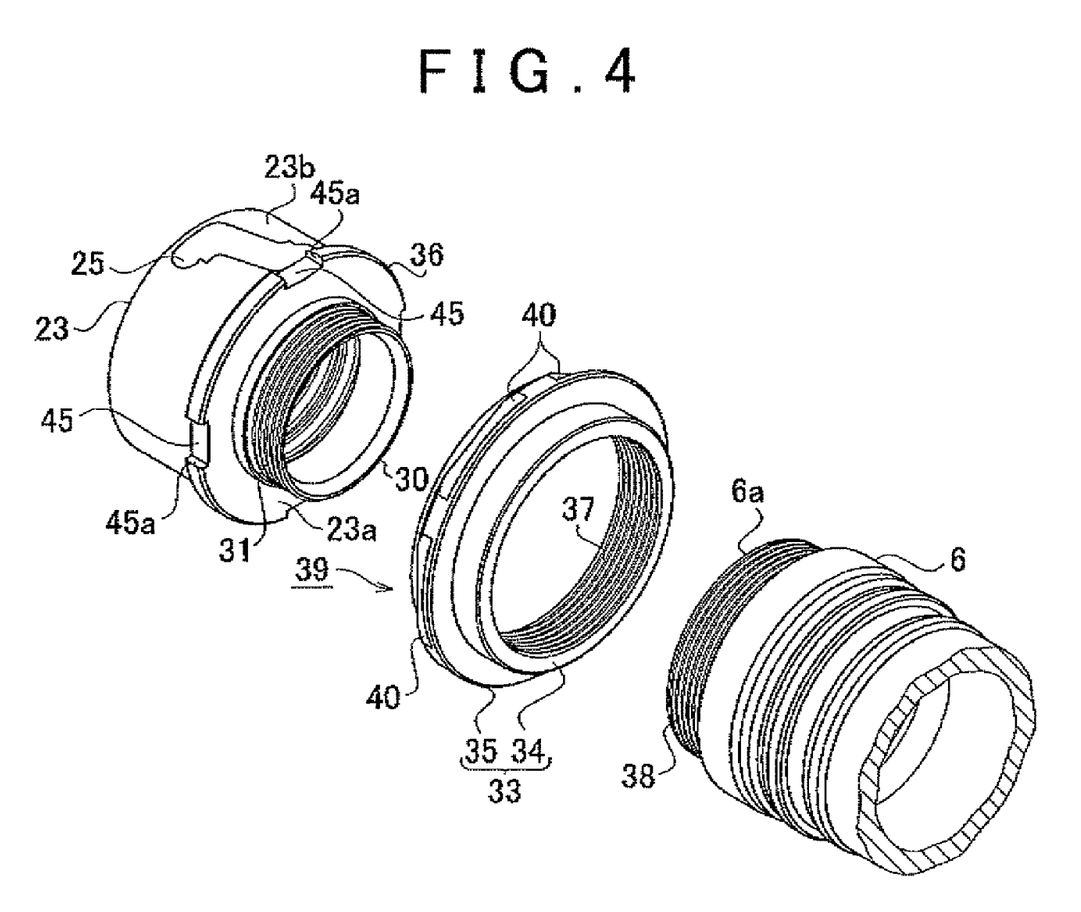
FIG. 4 is a perspective view showing the ball screw nut, the motor shaft, and the flange member.

As shown in FIGS. 2 to 4, a hollow threaded shaft 30 that extends in the axial direction is formed at an axial end portion 23a (right end portion in FIG. 2) of the ball screw nut 23. A threaded portion 32 is formed in the inner periphery of the motor shaft 6. The threaded portion 32 corresponds to a threaded portion 31 that is formed in the outer periphery of the threaded shaft 30. When the threaded portion 31 of the threaded shaft 30 formed at the axial end portion 23a of the ball screw nut 23 is screwed to the threaded portion 32 formed in the inner periphery of the motor shaft 6, the ball screw nut 23 is secured to the axial end portion 6a of the motor shaft 6.

A flange member 33 is fitted to the outer periphery of the motor shaft 6, more specifically, the outer periphery of the axial end portion 6a of the motor shaft 6. The flange member 33 is lager in diameter than the ball screw nut 23. By restricting the rotation of the flange member 33, it is possible to restrict simultaneous rotation of the ball screw nut 23 and the motor shaft 6 in the same direction when the ball screw nut 23 is screwed to the motor shaft 6.

When the ball screw nut 23 is screwed to the axial end portion 6a of the rotatably supported motor shaft 6 in the axial direction, it is necessary to restrict the simultaneous rotation of the motor shaft 6 and the ball screw nut 23 in the same direction (restrict the motor shaft 6 and the ball screw nut 23 from rotating together with each other). In the embodiment, it is possible to restrict the motor shaft 6 from rotating together with the ball screw nut 23 by holding the flange member 33 fitted to the motor shaft 6 at a predetermined position in the motor housing 12. Thus, it is possible to easily and reliably screw the ball screw nut 23 to the motor shaft 6.

More specifically, the flange member 33 has a cylindrical base portion 34 and a rib portion 35 that extends radially outward from the outer periphery of the base portion 34. A flange portion 36 that extends radially outward is formed at the axial end portion 23a of the ball screw nut 23. An outer diameter R1 of the rib portion 35 of the flange member 33 is larger than an outer diameter R2 of the flange portion 36 of the ball screw nut 23 (see FIG. 2: R1>R2). Thus, the outer peripheral edge of the rib portion 35 is located further radially outward than the outer peripheral edge of the flange portion 36 of the ball screw nut 23.

A threaded portion 37 is formed in the inner periphery of the base portion 34 of the flange member 33, and a threaded portion 38 is formed in the outer periphery of the axial end portion 6a of the motor shaft 6. When the threaded portion 37 formed in the base portion 34 is screwed to the threaded portion 38 of the motor shaft 6, the flange member 33 is screwed to the outer periphery of the axial end portion 6a of the motor shaft 6.

The threaded portions 37 and 38 are formed in such a manner that the screw direction of the threaded portions 37 and 38 is opposite to the screw direction of the threaded portion 31 formed in the threaded shaft 30 and the threaded portion 32 formed in the inner periphery of the motor shaft 6, that is, the rotational direction when the threaded portions 37 and 38 are screwed to each other is opposite to the rotational direction when the threaded portions 31 and 32 are screwed to each other. More specifically, the threaded portions 31 and 32 used to screw the ball screw nut 23 to the motor shaft 6 are right-hand threads, whereas the threaded portions 37 and 38 used to screw the flange member 33 to the motor shaft 6 are left-hand threads.

The screw direction of the threaded portions 31 and 32 used to screw the ball screw nut 23 to the motor shaft 6 is opposite to the screw direction of the threaded portions 37 and 38 used to screw the flange member 33 to the motor shaft 6. With this arrangement, when one of the ball screw nut 23 and the flange member 33 is loosened by the rotation relative to the motor shaft 6, the other of the ball screw nut 23 and the flange member 33 is tightened.

When the ball screw nut 23 is screwed to the motor shaft 6, the motor shaft 6 attempts to rotate in the same direction as the ball screw nut 23. However, the direction in which the motor shaft 6 attempts to rotate together with the ball screw nut 23 is the direction in which the motor shaft 6 is more tightly screwed to the flange member 33. Accordingly, if the rotation of the flange member 33 is restricted by, for example, a jig, it is possible to restrict the rotation of the motor shaft 6 together with the ball screw nut 23 when the ball screw nut 23 is screwed to the motor shaft 6. By holding the rib portion 35 of the flange member 33 which projects radially outward from the outer periphery of the ball screw nut 23, it is possible to restrict the motor shaft 6 from rotating together with the ball screw nut 23 when the ball screw nut 23 is screwed to the motor shaft 6.

More specifically, as shown in FIGS. 3 and 4, an engaged portion 39 is formed in the rib portion 35 of the flange member 33, which is larger in diameter than the ball screw nut 23. When the engaged portion 39 is engaged with a restricting member, for example, a jig or a tool, the rotation of the flange member 33 is restricted.

Figure 5:
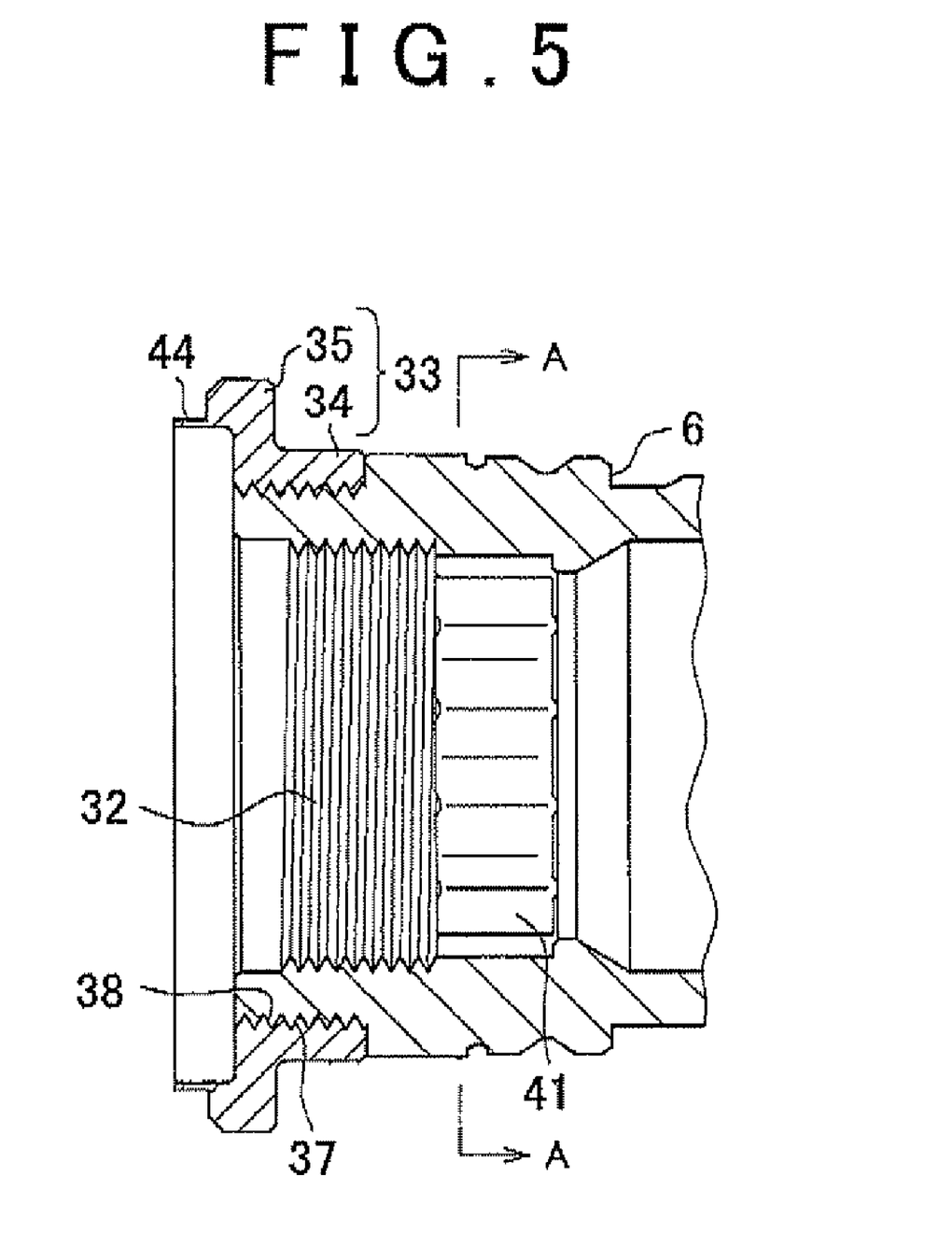
FIG. 5 is a cross-sectional view showing the motor shaft to which the flange member is fitted (screwed)

The engaged portion 39 is formed by forming multiple (six in the embodiment) recesses 40 in the peripheral edge portion of the face of the rib portion 35, which is proximal to the ball screw nut 23 that is to be screwed to the motor shaft 6 (screw-side face 35a located on the left side in FIG. 5). The engaged portion 39 is formed in such a shape that a polygonal cylindrical jig (for example, a hexagonal cylindrical jig) may be engaged with engaged portion 39. This shape is achieved by forming the recesses 40 in the peripheral edge portion of the screw-side face 35a at regular intervals in the circumferential direction. When the ball screw nut 23 is screwed to the motor shaft 6, the jig is engaged with the engaged portion 39 from the axial direction to restrict the motor shaft 6 from rotating together with the ball screw nut 23. In this state, the ball screw nut 23 is inserted from the inside of the jig. As a result, it is possible to easily and reliably screw the ball screw nut 23 to the axial end portion 6a of the motor shaft 6.

Figure 6A:
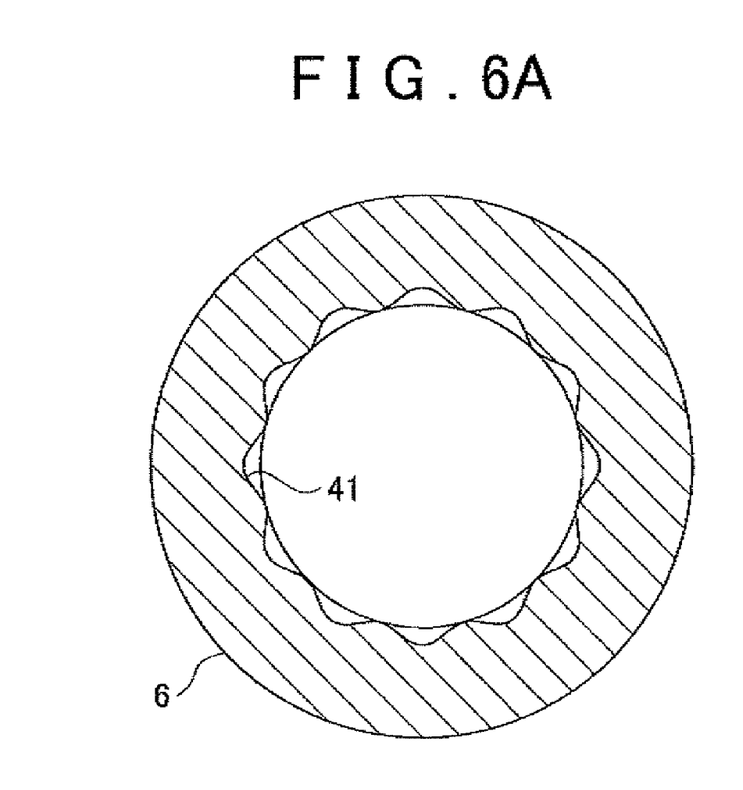
FIG. 6A is a cross-sectional view taken along the line A-A in FIG. 5.

In addition, an engaged portion 41 is formed in the inner periphery of the motor shaft 6. When the engaged portion 41 is engaged with a restricting member, for example, a jig or a tool, the rotation of the motor shaft 6 is restricted. More specifically, the engaged portion 41 is formed in a portion of the inner periphery, which is further axially inward (right side in FIG. 5) than the threaded portion 32 used to screw the ball screw nut 23 to the motor shaft 6. As shown in FIG. 6A, the engaged portion 41 is formed by forming a plurality (twelve in the embodiment) of triangular grooves, extending in the axial direction, at regular intervals in the circumferential direction. When the flange member 33 is screwed to the motor shaft 6, a polygonal columnar (polygonal cylindrical) jig (for example, hexagonal cylindrical jig) is inserted into the motor shaft 6 and engaged with the engaged portion 41. As a result, it is possible to restrict the rotation of the motor shaft 6 to restrict the motor shaft 6 from rotating together with the ball screw nut 23.

Also, the flange member 33 serves as a restriction portion that restricts relative rotation between the motor shaft 6 and the ball screw nut 23 that is screwed to the axial end portion 6a of the motor shaft 6.

More specifically, as shown in FIGS. 2 to 5, an annular thin-plate portion 44 is formed on the rib portion 35 of the flange member 33. The thin-plate portion 44 extends in the axial direction from the screw-side face 35a of the rib portion 35 toward the ball screw nut 23 that is to be screwed to the motor shaft 6 (left side in FIGS. 2 and 5). Thus, the thin-plate portion 44 surrounds the outer periphery of the flange portion 36 that is formed at the axial end portion 23a of the ball screw nut 23. Multiple (four in the embodiment) cutouts 45 are formed in the flange portion 36 of the ball screw nut 23. The cutouts 45 are formed at regular intervals in the circumferential direction. The thin-plate portion 44 of the flange member 33 is pressed from radially outer side to be swaged into the cutouts 45. Thus, the relative rotation between the ball screw nut 23 and the flange member 33, that is, the relative rotation between the ball screw nut 23 and the motor shaft 6 is restricted.

Figure 6B:
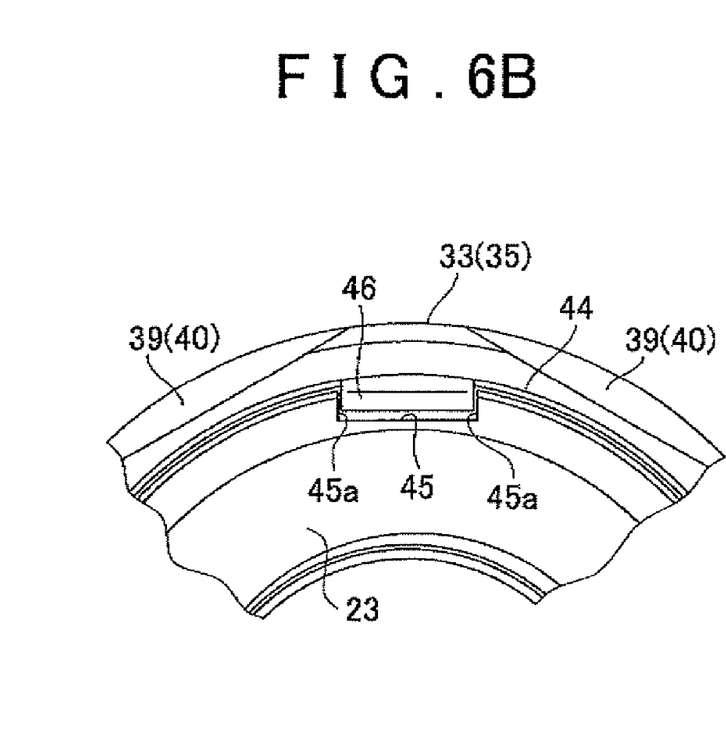
FIG. 6B is a front view showing the state where a thin-plate portion of the flange member is swaged into a cutout formed in a flange portion of the ball screw nut.

When the thin-plate portion 44 is folded into the cutouts 45 through a swaging process, the thin-plate portion 44 is cut along side faces 45a of the cutouts 45 as shown in FIG. 6B. Then, engagement pieces 46 formed by cutting the thin-plate portion 44 are engaged in the cutouts 45. In this way, the thin-plate portion 44 is more firmly swaged into the cutouts 45 so that the relative rotation between the ball screw nut 23 and the motor shaft 6 is restricted more reliably.

Next, description will be provided concerning a work procedure that is taken when the ball screw nut 23 is secured (screwed) to the motor shaft 6 in the EPS 1 structured as described above according to the embodiment.

As described above, the motor shaft 6 is supported by the bearing 7 fitted to the side housing 13 that blocks the opening 11a from among the openings 11a and 11b formed at the respective axial ends of the motor housing 2. Thus, the motor shaft 6 is rotatably arranged in the motor housing 12 (see FIG. 1). Therefore, the ball screw nut 23 is inserted into the motor housing 12 together with the rack shaft 3 through the remaining opening 11b of the motor housing 12, and screwed and secured to the axial end portion 6a of the motor shaft 6.

Figure 7:
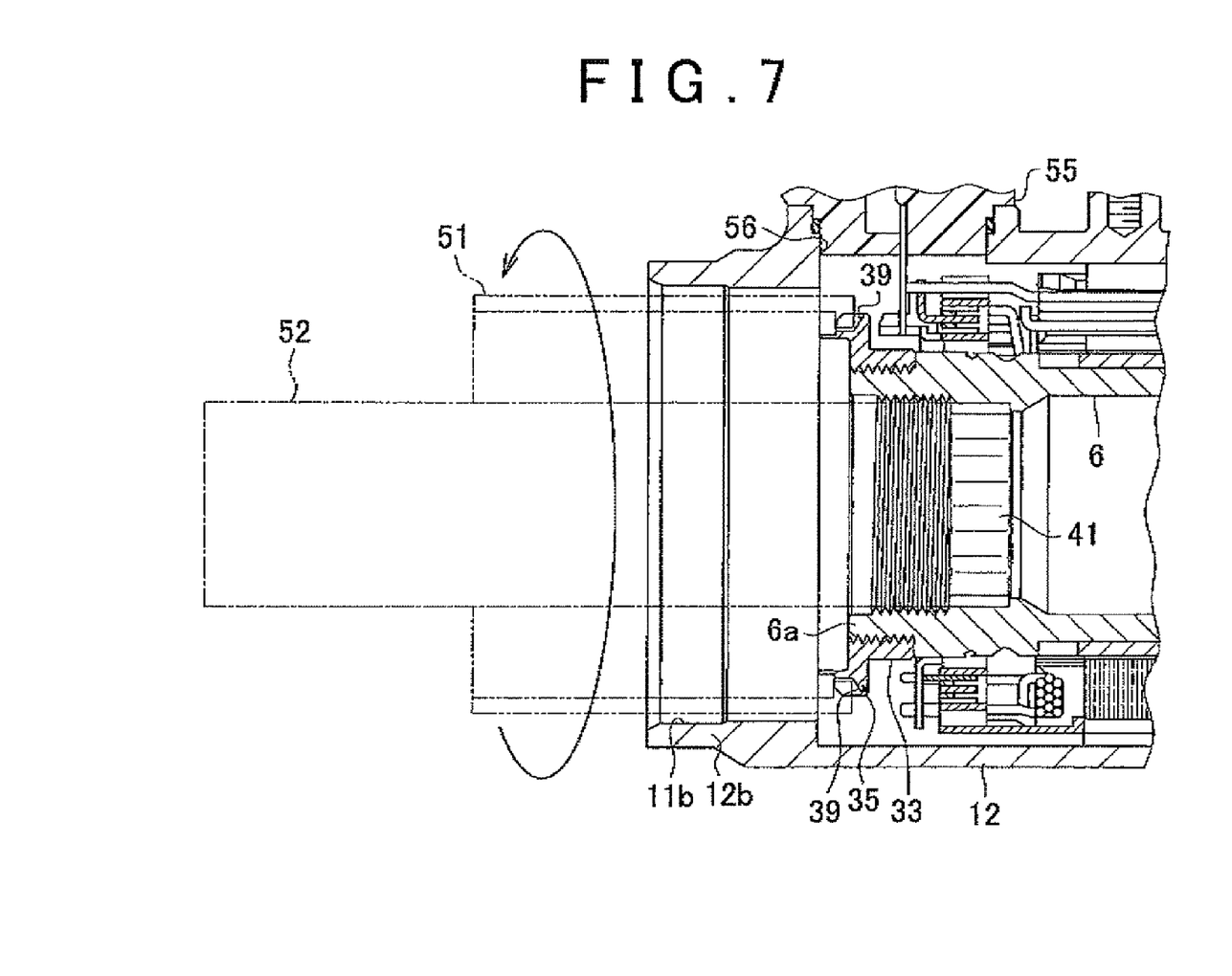
FIG. 7 is a view illustrating a work procedure that is taken when the ball screw nut is secured (screwed) to the motor shaft.

More specifically, as shown in FIG. 7, a step of screwing the flange member 33 to the outer periphery of the motor shaft 6 is performed before the ball screw nut 23 is screwed to the motor shaft 6.

At this time, a polygonal (hexagonal in the embodiment) cylindrical jig 51 is engaged with the engaged portion 39 formed in the rib portion 35 of the flange member 33. A polygonal (hexagonal in the embodiment) columnar jig 52 is engaged with the engaged portion 41 formed in the inner periphery of the motor shaft 6. Then, the flange member 33 is screwed to the motor shaft 6 by rotating the jig 51 engaged with the engaged portion 39 of the flange member 33 while rotation of the motor shaft 6 is restricted by the jig 52 that is engaged with the engaged portion 41 of the motor shaft 6.

Figure 8:
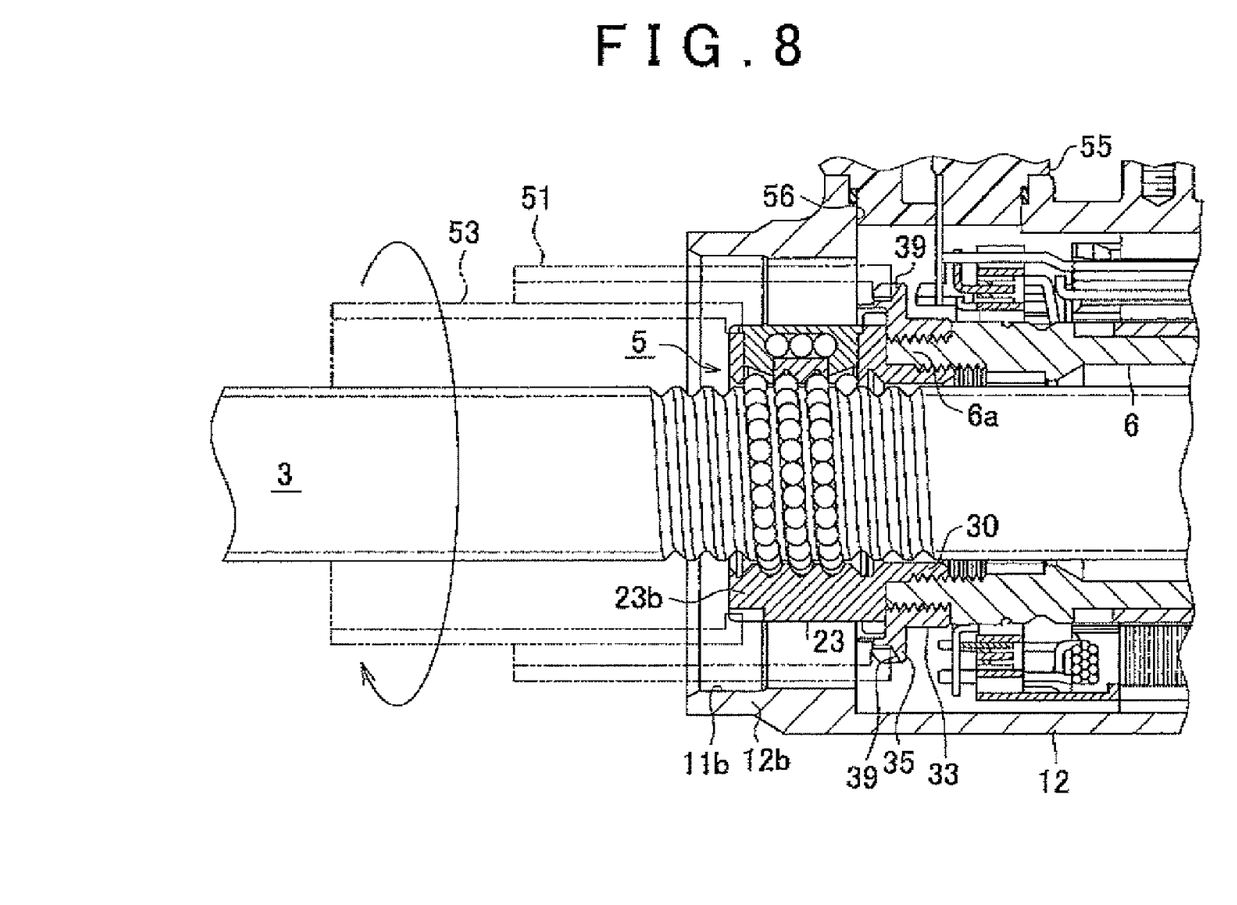
FIG. 8 is a is a view illustrating a work procedure that is taken when the ball screw nut is secured (screwed) to the motor shaft.

After the step of screwing the flange member 33 to the motor shaft 6 is completed, the jig 52 is removed through the opening 11b of the motor housing 12. Then, as shown in FIG. 8, after the rack shaft 3 is inserted into the motor shaft 6, a step of screwing the ball screw nut 23 to the axial end portion 6a is performed.

In this step, a jig 53 is inserted into the jig 51 and an axial end portion 23b of the ball screw nut 23 (a left side end portion in FIG. 8: an end portion that is close to the opening 11b) is held by the jig 53. Thus, the ball screw nut 23 can be rotated. The ball screw nut 23 is screwed to the motor shaft 6 by rotating the jig 53 that holds the axial end portion 23b of the ball screw nut 23 while the rotation of the flange member 33 is restricted by the jig 51 engaged with the engaged portion 39 of the flange member 33 to restrict the motor shaft 6 from rotating together with the ball screw nut 23.

After the step of screwing the ball screw nut 23 to the motor shaft 6 is completed, a step of swaging the thin-plate portion 44 of the flange member 33 is performed. More specifically, the jigs 51 and 53 used in the step of screwing the ball screw nut 23 are removed through the opening 11b of the motor housing 12, and a tool is inserted into the motor hosing 12 through the opening 11b. Then, the thin-plate portion 44 is swaged into the cutouts 45. As a result, the ball screw nut 23 is secured to the motor shaft 6 in such a manner that the ball screw nut 23 is not allowed to rotate relative to the motor shaft 6.

As shown in FIG. 1, a fitting hole 56 used to fit a feeding connector 55 for supplying drive current to the motor 4 is formed in the motor housing 12. The inside of the motor housing 12 can be seen through the fitting hole 56. Because the flange member 33 is fitted to the axial end portion 6a of the motor shaft 6, the flange member 33 is arranged at a position that corresponds to the fitting hole 56.

In each of the above-described steps of securing the ball screw nut 23 to the motor shaft 6, whether the jig 52 is properly engaged with the engaged portion 39 of the flange member 33 can be visually checked through the fitting hole 56. Similarly, whether the thin-plate portion 44 of the flange member 33 is properly swaged into the cutouts 45 can be visually checked through the fitting hole 56. Because whether the jig 52 is properly engaged with the engaged portion 39 and whether the thin-plate portion 44 is properly swaged into the cutouts 45 can be visually checked through the fitting hole 56, it is possible to easily and reliably secure the ball screw nut 23 to the motor shaft 6.

The opening 11b used in the above-described steps for securing the ball screw nut 23 to the motor shaft 6 is blocked by fitting the side housing 14 to the axial end portion 12b of the motor housing 12 after the step for securing the ball screw nut 23 to the motor shaft 6 is completed.

According to the embodiment, the following effects are obtained.

1) When the threaded portion 31 of the hollow threaded shaft 30 formed in the axial end portion 23a of the ball screw nut 23 is screwed to the threaded portion 32 formed in the inner periphery of the motor shaft 6, the ball screw nut 23 is screwed to the axial end portion 6a of the motor shaft 6. In addition, the flange member 33 that is larger in diameter than the ball screw nut 23 is fitted to the outer periphery of the axial end portion 6a of the motor shaft 6. The flange 33 is formed in such a manner that when the rotation of the flange member 33 is restricted, the simultaneous rotation of the ball screw nut 23 and the motor shaft 6 in the same direction is restricted when the ball screw nut 23 is screwed to the motor shaft 6.

With the structure described above, even when the ball screw nut 23 is screwed to the motor shaft 6 through the opening formed at the axial end portion of the motor housing 12, it is possible to easily restrict the rotation of the motor shaft 6 by holding the flange member 33 provided on the motor shaft 6 using, for example, a jig. As a result, even in the structure in which a force that rotates the motor shaft 6 in the same direction as the ball screw nut 23 (a force that causes the motor shaft 6 to rotate together with the ball screw nut 23) is applied to the motor shaft 6 when the ball screw nut 23 is screwed to the motor shaft 6, it is possible to restrict the motor shaft 6 from rotating together with the ball screw nut 23 and to secure the ball screw nut 23 to the motor shaft 6 more easily and reliably. Thus, it is possible to improve the work efficiency and the reliability.

2) The flange member 33 is screwed to the motor shaft 6. The threaded portions 37 and 38 are formed in the inner periphery of the base portion 34 of the flange member 33 and the outer periphery of the axial end portion 6a of the motor shaft 6, respectively, to screw the flange member 33 to the motor shaft. The threaded portions 31 and 32 are formed in the outer periphery of the threaded shaft 30 and the inner periphery of the motor shaft 6 to screw the ball screw nut 23 to the motor shaft 6. The screw direction of the threaded portions 37 and 38 is opposite to the screw direction of the threaded portions 31 and 32.

With the structure described above, it is possible to restrict the motor shaft 6 from rotating together with the ball screw nut 23 when the ball screw nut 23 is screwed to the motor shaft 6, by restricting the rotation of the flange member 33. It is also possible to easily and reliably fit the flange member 33 to the motor shaft 6.

In the EPS, the motor rotational direction is frequently changed. Therefore, if there is a clearance between the motor shaft 6 and a member fitted on the motor shaft 6, for example, the flange member 33 in the circumferential direction, the clearance serves as a rotation backlash and a contact sound is generated each time the motor rotational direction is changed. However, if the flange member 33 is screwed to the motor shaft 6 as described above, the clearance between the motor shaft 6 and the member fitted to the motor shaft 6 is eliminated. Accordingly, a contact sound is not generated.

3) The engaged portion 39 is formed in the rib portion 35 of the flange member 33, which is larger in diameter than the ball screw nut 23. When the engaged portion 39 is engaged with a restricting member, for example, a jig or a tool, the rotation of the flange member 33 is restricted.

With the structure described above, it is possible to easily restrict the rotation of the flange member 33 with the use of, for example, a jig. As a result, it is possible to more easily and reliably screw the ball screw nut 23 to the motor shaft 6.

4) The engaged portion 41 is formed in the inner periphery of the motor shaft 6. When the engaged portion 41 is engaged with a restricting member, for example, a jig or a tool, the rotation of the motor shaft 6 is restricted.

With the structure described above, when the flange member 33 is screwed to the motor shaft 6, it is possible to easily restrict the motor shaft 6 from rotating together with the ball screw nut 23. As a result, it is possible to easily and reliably screw the flange member 33 to the motor shaft 6. Thus, it is possible to improve the work efficiency and the reliability.

5) The fitting hole 56 used to fit the feeding connector 55 for supplying drive current to the motor 4 is formed in the motor housing 12. When the flange member 33 is fitted to the motor shaft 6, the flange member 33 is arranged at a position that corresponds to the fitting hole 56.

With the structure described above, for example, whether the jig 52 is properly engaged with the engaged portion 39 can be visually checked through the fitting hole 56. As a result, it is possible to easily and reliably secure the ball screw nut 23 to the motor shaft 6.

The above-described embodiment may be modified as follows.

In the embodiment described above, the flange member 33 is screwed to the motor shaft 6. However, any structure may be employed as long as it is possible to restrict the rotation of the ball screw nut 23 and the motor shaft 6 in the same direction when the ball screw nut 23 is screwed to the motor shaft 6 by restricting the rotation of the flange member 33. Accordingly, the flange member 33 may be fitted to the motor shaft 6 in such a manner that the relative rotation between the flange member 33 and the motor shaft 6 is not allowed.

Figure 9:
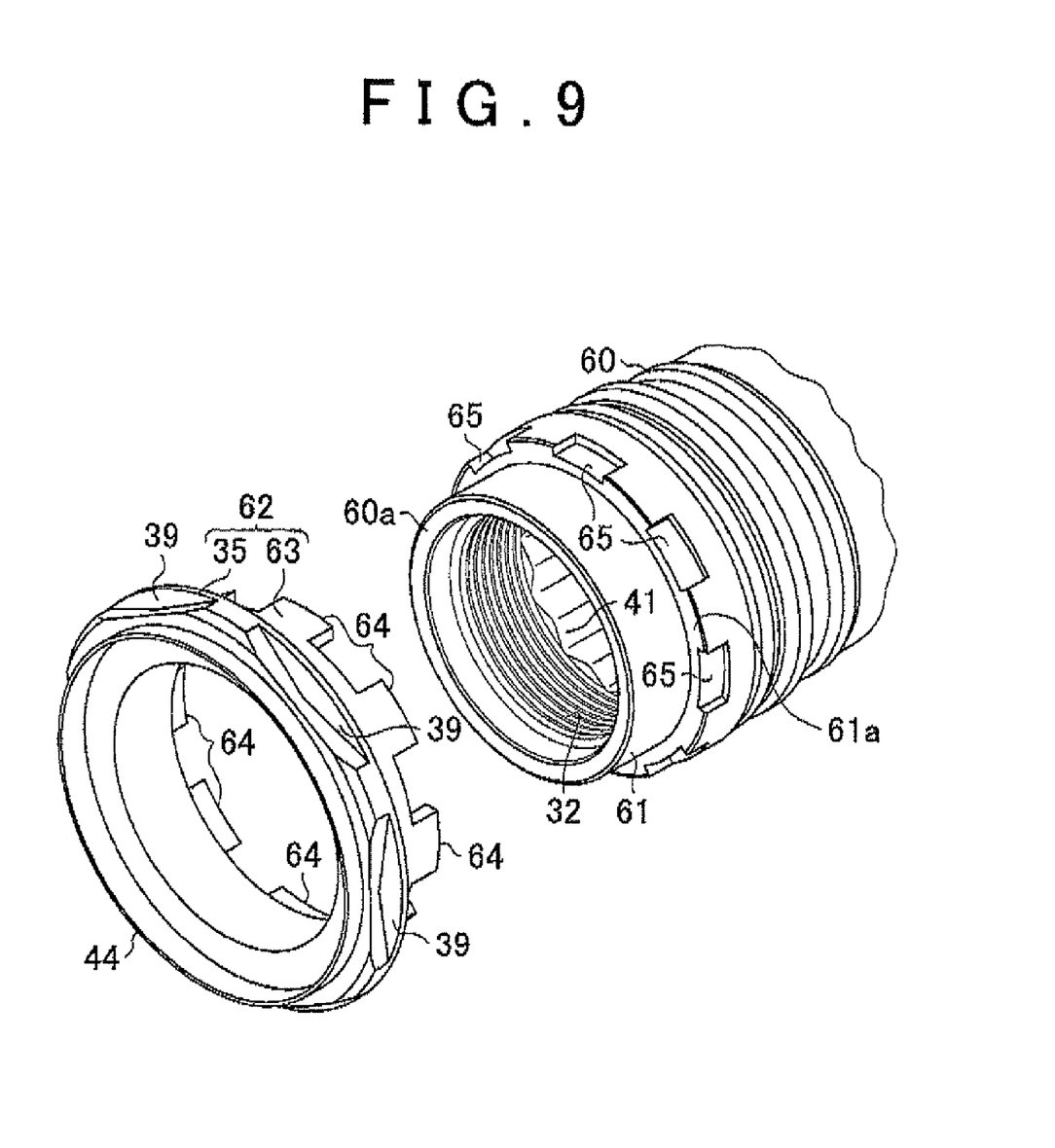
FIG. 9 is a perspective view showing a flange member and a motor shaft according to a first modification.
Figure 10A:
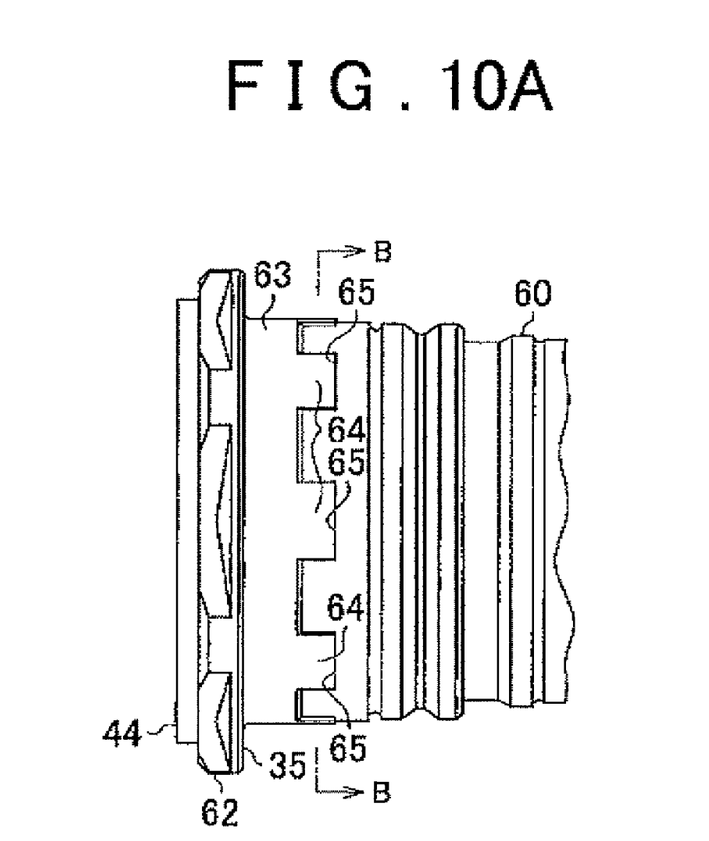
FIG. 10A is a side view of the motor shaft to which the flange member is fitted according to the first modification.
Figure 10B:
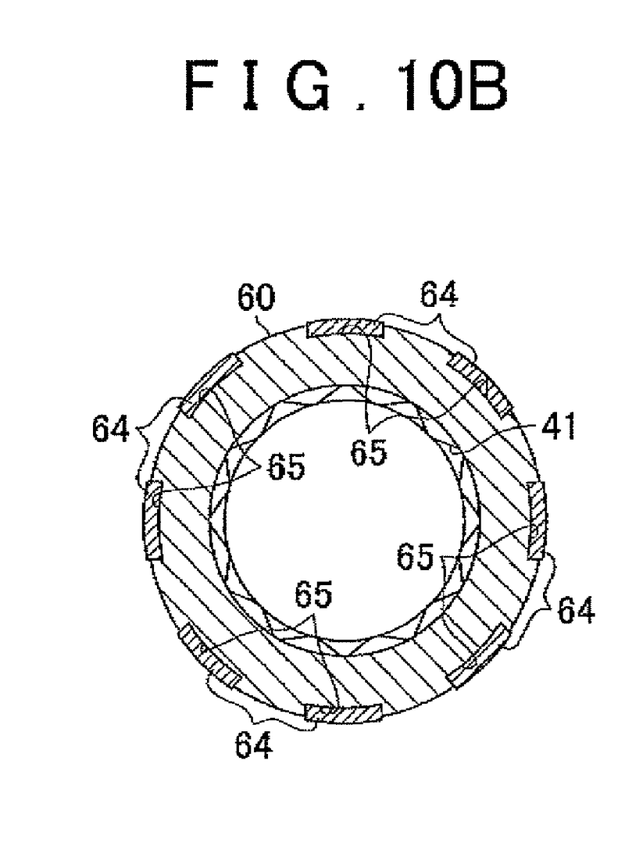
FIG. 10B is a cross-sectional view showing the motor shaft to which the flange member is fitted according to the first modification, taken along the line B-B in FIG. 10A.

More specifically, as shown in FIGS. 9, 10A and 10B, an annular engagement recess 61 is formed in the outer periphery of an axial end portion 60a of a motor shaft 60, and a flange member 62 is fitted in the engagement recess 61 in the axial direction. In this case, a threaded portion is formed in neither the engagement recess 61 of the motor shaft 60 nor a base portion 63 of the flange member 62. When the motor shaft 60 and the flange member 62 are engaged with each other, an engaging portion that restricts the relative rotation between the motor shaft 60 and the flange member 62 is formed in the motor shaft 60 and the flange member 62.

In this modification, multiple engagement projections 64 that extend in the axial direction are formed in the base portion 63 of the flange member 62. In addition, multiple engagement recesses 65 are formed in the outer periphery of the motor shaft 60. The engagement recesses 65 open at an axial end face 61a of the engagement recess 61, and the engagement projections 64 of the base end portion 63 of the flange member 62, which is fitted in the engagement recess 61, are engaged in the engagement recesses 65. When the engagement projections 64 are engaged in the engagement recesses 65, the relative rotation between the motor shaft 60 and the flange member 62 is restricted.

With this structure, it is possible to effectively restrict the motor shaft 60 from rotating together with the ball screw nut when the ball screw nut is screwed to the motor shaft 60. In addition, it is possible to more easily fit the flange member 62 to the motor shaft 60.

Figure 11:
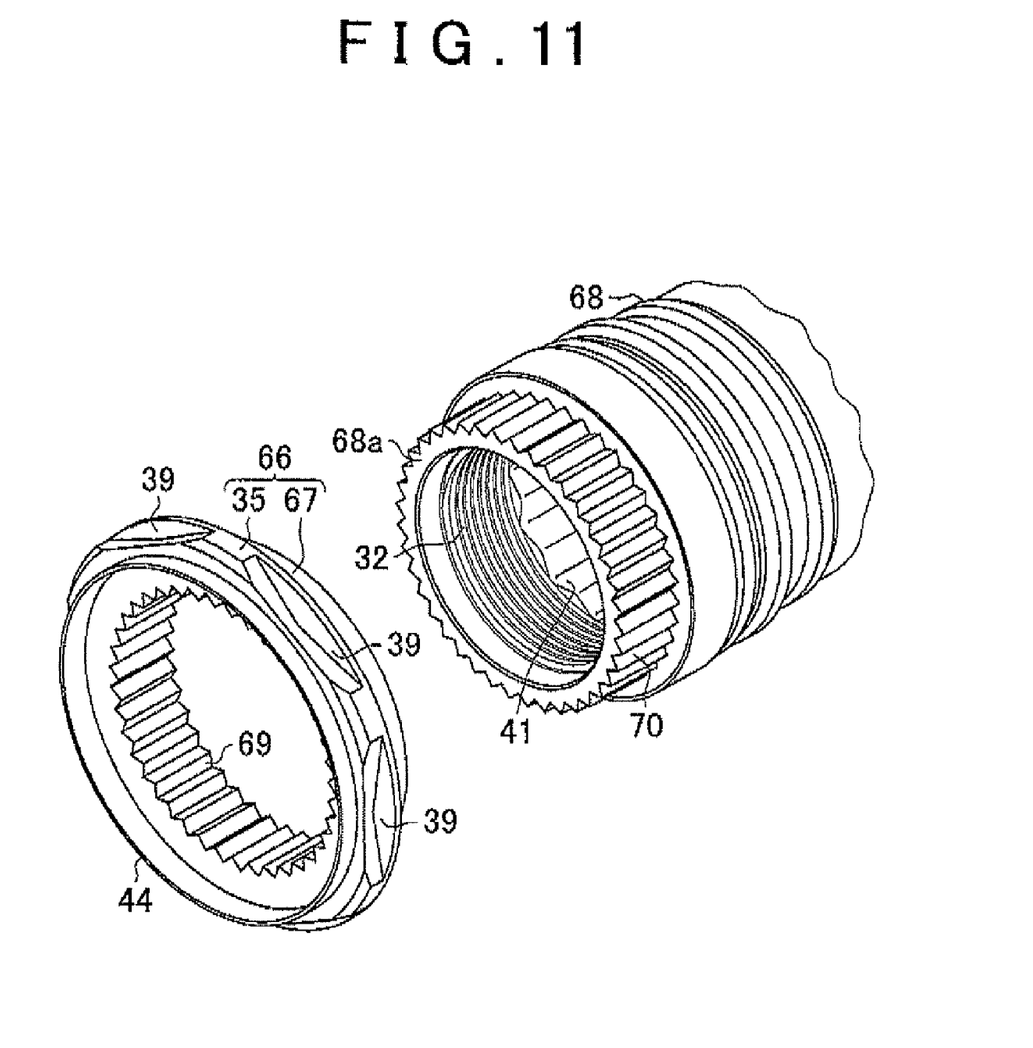
FIG. 11 is a perspective view showing a flange member and a motor shaft according to a second modification.
Figure 12A:
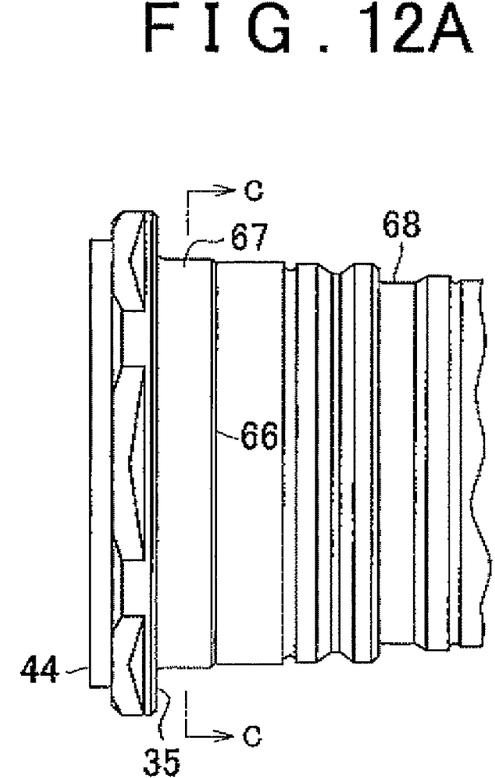
FIG. 12A is a side view of the motor shaft to which the flange member is fitted according to the second modification.
Figure 12B:
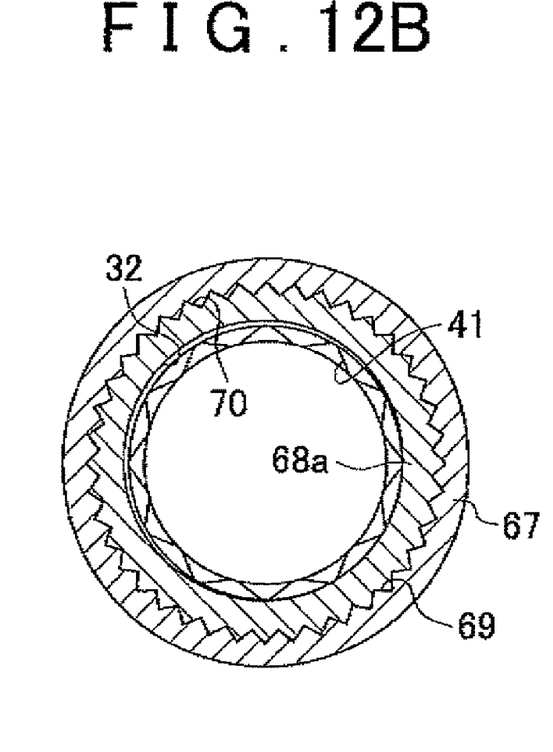
FIG. 12B is a cross-sectional view showing the motor shaft to which the flange member is fitted according to the second modification, taken along the line C-C in FIG. 12A.

The structure of the engaging portion used to fit the flange member to the motor shaft in such a manner that the relative rotation between the flange member and the motor shaft is not allowed is not limited to the example shown in FIGS. 9, 10A and 10B. For example, as shown in FIGS. 11, 12A and 12B, a spline-engagement portion (serration-engagement portion) 69 may be formed in the inner periphery of a base portion 67 of a flange member 66, and a spline-engagement portion (serration-engagement portion) 70 may be formed in the outer periphery of an axial end portion 68a of a motor shaft 68. When the spline-engagement portions 69 and 70 are engaged with each other, the relative rotation between the motor shaft 60 and the flange member 62 is restricted.

In the embodiment described above, there is formed the engaged portion 39 that restricts the rotation of the flange member 33 when a jig is engaged with the engaged portion 39. The engaged portion 39 is formed by forming the multiple recesses 40 in the peripheral edge portion of the screw-side face 35a of the rib portion 35 of the flange member 33. However, the shape and the position of the engaged portion 39 are not limited to these, and may be changed based on a jig or a tool that is used. Similarly, the shape and the position of the engaged portion 41 formed in the inner periphery of the motor shaft 6 are not limited to those described above, and may be changed based on a jig or a tool that is used.

The technical concept that is figured out based on the above embodiment will be described below.

The technical concept relates to a method for producing an electric power steering system that includes: a rack shaft that is able to reciprocate in an axial direction; a motor shaft through which the rack shaft passes; and a ball screw device that converts rotation of the motor shaft into axial movement of the rack shaft, wherein the ball screw device is formed by arranging a plurality of balls within a helical ball-rolling path that is formed by aligning a thread groove formed in an inner periphery of a ball screw nut and a thread groove formed in an outer periphery of the rack shaft with each other, and wherein the ball screw nut is inserted into a motor housing that has openings at respective axial ends, one of the openings being blocked by a side housing fitted to the motor housing, through the remaining opening that is not blocked, and the ball screw nut is screwed to the motor shaft, which is rotatably supported in the motor housing, in the axial direction and secured to an axial end portion of the motor shaft. In the method, a hollow threaded shaft that is screwed to a threaded portion formed in the inner periphery of the motor shaft is formed in an axial end portion of the ball screw nut, a flange member that is larger in diameter than the ball screw is fitted to the axial end portion of the motor shaft, and the ball screw nut is fitted to the motor shaft while the rotation between the motor shaft and the ball screw nut in the same direction is restricted by holding the flange member.

What is claimed is:

1. An electric power steering system, comprising:
   a rack shaft that is able to reciprocate in an axial direction;
   a motor shaft through which the rack shaft passes; and
   a ball screw device that converts rotation of the motor shaft into axial movement of the rack shaft,
   wherein the ball screw device is formed by arranging a plurality of balls within a helical ball-rolling path that is formed by aligning a thread groove formed in an inner periphery of a ball screw nut and a thread groove formed in an outer periphery of the rack shaft with each other,
   wherein the ball screw nut is inserted into a motor housing that has openings at respective axial ends, one of the openings being blocked by a side housing fitted to the motor housing, through the remaining opening that is not blocked, and the ball screw nut is screwed to the motor shaft, which is rotatably supported in the motor housing, in the axial direction and secured to an axial end portion of the motor shaft, and
   wherein a hollow threaded shaft that is screwed to a threaded portion formed in the axial end portion of the motor shaft is formed in an axial end portion of the ball screw nut, a flange member that is larger in diameter than the ball screw nut and that has an engaged portion that restricts rotation of the flange member when being engaged with a restricting member is fitted to the motor shaft, and simultaneous rotation between the motor shaft and the ball screw nut in the same direction when the ball screw nut is screwed to the motor shaft is restricted by restricting the rotation of the flange member.

2. The electric power steering system according to claim 1, wherein the engaged portion of the flange member is formed in a peripheral edge portion of the flange member.

3. The electric power steering system according to claim 1, wherein:
   the flange member is screwed to a threaded portion formed in an outer periphery of the motor shaft; and
   the threaded portion is formed in such a manner that a screw direction of the threaded portion is opposite to a screw direction of the threaded portion formed in an inner periphery of the motor shaft, to which the threaded shaft is screwed.

4. The electric power steering system according to claim 3, wherein the engaged portion that restricts the rotation of the motor shaft when being engaged with the restricting member is formed in the inner periphery of the motor shaft.

5. The electric power steering system according to claim 1 wherein:
   the flange member is fitted on an outer periphery of the motor shaft; and
   an engaging portion that restricts relative rotation between the flange member and the motor shaft is formed in the flange member and the motor shaft.

6. The electric power steering system according to claim 1 wherein:
   a fitting hole used to fit a feeding connector is formed in the motor housing that houses the motor shaft; and
   the flange member is located at a position that corresponds to the fitting hole.

* * * * *